(12) United States Patent
Su et al.

(10) Patent No.: US 11,936,026 B2
(45) Date of Patent: Mar. 19, 2024

(54) TEMPERATURE CONTROL COMPONENT AND BATTERY PACK

(71) Applicant: Contemporary Amperex Technology Co., Limited, Ningde (CN)

(72) Inventors: Yongqiang Su, Ningde (CN); Zengzhong Wang, Ningde (CN); Zhanyu Sun, Ningde (CN); Chenling Zheng, Ningde (CN); Bingtuan Luo, Ningde (CN); Qingyuan Deng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 710 days.

(21) Appl. No.: 17/044,473

(22) PCT Filed: Jun. 16, 2020

(86) PCT No.: PCT/CN2020/096395
§ 371 (c)(1),
(2) Date: Oct. 1, 2020

(87) PCT Pub. No.: WO2020/253684
PCT Pub. Date: Dec. 24, 2020

(65) Prior Publication Data
US 2023/0091830 A1    Mar. 23, 2023

(30) Foreign Application Priority Data

Jun. 18, 2019  (CN) .......................... 201910528260.9
Jun. 18, 2019  (CN) .......................... 201910528787.1
Jun. 18, 2019  (CN) .......................... 201910528792.2

(51) Int. Cl.
H01M 50/20      (2021.01)
H01M 10/613     (2014.01)
(Continued)

(52) U.S. Cl.
CPC ..... *H01M 10/6557* (2015.04); *H01M 10/613* (2015.04); *H01M 10/6555* (2015.04); *H01M 10/6563* (2015.04); *H01M 50/209* (2021.01)

(58) Field of Classification Search
CPC ........... H01M 10/6557; H01M 10/613; H01M 10/6555; H01M 10/6563; H01M 50/209;
(Continued)

(56) References Cited

U.S. PATENT DOCUMENTS

2003/0211384 A1* 11/2003 Hamada .............. H01M 50/209
                                                                429/120
2013/0164578 A1    6/2013 Sweet
(Continued)

FOREIGN PATENT DOCUMENTS

CN           1877883 A        12/2006
CN        103608965 A          2/2014
(Continued)

OTHER PUBLICATIONS

Partial Supplementary European Search Report dated Jun. 15, 2021, in connection with corresponding EP Application No. 20775799.8 (13pp.).
(Continued)

*Primary Examiner* — Kenneth J Douyette
(74) *Attorney, Agent, or Firm* — Anova Law Group, PLLC

(57) ABSTRACT

The present application provides a temperature control component, which includes a first side plate, a second side plate and a first buffer plate. A cavity is formed by the second side plate and the first side plate; the first buffer plate is disposed between the second side plate and the first side plate to divide the cavity into multiple channels, and at least part of the first buffer plate extends obliquely from the first side plate towards the second side plate. The present application
(Continued)

also provides a battery pack, which includes the temperature control component described above.

20 Claims, 18 Drawing Sheets

(51) Int. Cl.
*H01M 10/6555* (2014.01)
*H01M 10/6557* (2014.01)
*H01M 10/6563* (2014.01)
*H01M 50/209* (2021.01)

(58) Field of Classification Search
CPC ............ H01M 10/625; H01M 10/651; H01M 10/6566; H01M 50/204; Y02E 60/10
See application file for complete search history.

(56) References Cited

U.S. PATENT DOCUMENTS

| | | | | |
|---|---|---|---|---|
| 2015/0037662 | A1* | 2/2015 | Pinon | H01M 50/105 29/623.2 |
| 2016/0204488 | A1* | 7/2016 | Arai | B60H 1/00278 429/62 |

FOREIGN PATENT DOCUMENTS

| | | |
|---|---|---|
| CN | 210136906 U | 3/2020 |
| CN | 210136907 U | 3/2020 |
| CN | 210136908 U | 3/2020 |
| JP | 2000-048867 A | 2/2000 |
| JP | 2004-235110 A | 8/2004 |
| JP | 2006073461 A | 3/2006 |
| JP | 2011023180 A | 2/2011 |
| JP | 2019046578 A | 3/2019 |
| KR | 20160058684 A | 5/2016 |

OTHER PUBLICATIONS

International Search Report dated Sep. 15, 2020 in corresponding International application No. PCT/CN2020/096395; 4 pages.
Office Action dated Mar. 8, 2022, in connection with corresponding Indian Application No. 202127044480; 7 pages with English Translation.
Japan Patent Office (JPO) The Notice of Reasons for refusal For JP Application No. 2021-558705 dated Nov. 24, 2022 10 Pages (Translation Included).
Korean Intellectual Property Office (KIPO) The Request for the Submission of an Opinion For KR Application No. 10-2021-7035608 dated Aug. 11, 2023 9 Pages (Translation Included ).
Japan Patent Office (JPO) The Notice of Reasons for refusal For JP Application No. 2021-558705 dated Jan. 24, 2023 10 Pages (Translation Included).
The European Patent Office (EPO) Communication pursuant to Article 94(3) for EP Application No. 20775799.8, dated May 27, 2022 5 Pages.
The European Patent Office (EPO) Communication pursuant to Article 94(3) for EP Application No. 20775799.8 dated Oct. 4, 2022 5 Pages.
The European Patent Office (EPO) Communication pursuant to Article 94(3) for EP Application No. 20775799.8 dated Apr. 12, 2023 6 Pages.
The European Patent Office (EPO) Extended Search Report for EP Application No. 20775799.8 dated Sep. 15, 2021 10 Pages.
Intellectual Property India The Examination report For IN Application No. 202127044480 dated Mar. 8, 2022 7 Pages.
Japan Patent Office (JPO) Decision to Grant a Patent For JP Application No. 2021-558705 dated May 29, 2023 5 Pages (Translation Included).
The World Intellectual Property Organization (WIPO) International Search Report and written opinion for PCT/CN2020/096395 dated Sep. 15, 2020 15 pages (including English translation).

* cited by examiner

TEMPERATURE CONTROL COMPONENT AND BATTERY PACK

CROSS-REFERENCE TO RELATED APPLICATIONS

The present application is a National Stage of International Application No. PCT/CN2020/096395, filed on Jun. 16, 2020, which claims priority to Chinese Patent Application No. 201910528792.2, filed to China National Intellectual Property Administration on Jun. 18, 2019 and entitled "TEMPERATURE CONTROL COMPONENT AND BATTERY PACK", Chinese Patent Application No. 201910528260.9, filed to China National Intellectual Property Administration on Jun. 18, 2019 and entitled "TEMPERATURE CONTROL COMPONENT AND BATTERY PACK"; and Chinese Patent Application No. 201910528787.1, filed to China National Intellectual Property Administration on Jun. 18, 2019 and entitled "TEMPERATURE CONTROL COMPONENT AND BATTERY PACK". The disclosures of the aforementioned applications are incorporated herein by reference in their entireties.

TECHNICAL FIELD

The present application relates to the field of battery technology and, in particular, to a temperature control component and a battery pack.

BACKGROUND

A battery pack usually includes multiple batteries grouped together. In a group technology, besides ensurance on strength and performance of a structure itself, influences of the structure on battery life also need to be considered, where temperature and expansion force have a great influence on the battery life, so thermal management and expansion force design must be considered during designing.

SUMMARY

An objective of the present application is to provide a temperature control component and a battery pack. When the temperature control component is applied to the battery pack, the temperature control component not only could perform thermal management on batteries, but also could absorb expansion forces generated by the batteries, thus deformations of the batteries generated under the action of the expansion forces could be reduced, and the service life of the batteries could be greatly improved.

In order to achieve the above objective, in a first aspect, an embodiment of the present application provides a temperature control component, including: a first side plate; a second side plate, disposed opposite to the first side plate in a longitudinal direction, and connected with the first side plate to form a cavity together with the first side plate; and a first buffer plate, disposed between the second side plate and the first side plate and connected with the second side plate and the first side plate to divide the cavity into multiple channels, wherein at least part of the first buffer plate extends obliquely from the first side plate towards the second side plate.

In a second aspect, an embodiment of the present application provides a battery pack, which includes multiple batteries and the temperature control component described above. The multiple batteries include a first battery and a second battery, and the temperature control component is disposed between the first battery and the second battery.

DETAILED DESCRIPTION OF EMBODIMENTS

Figure 1:
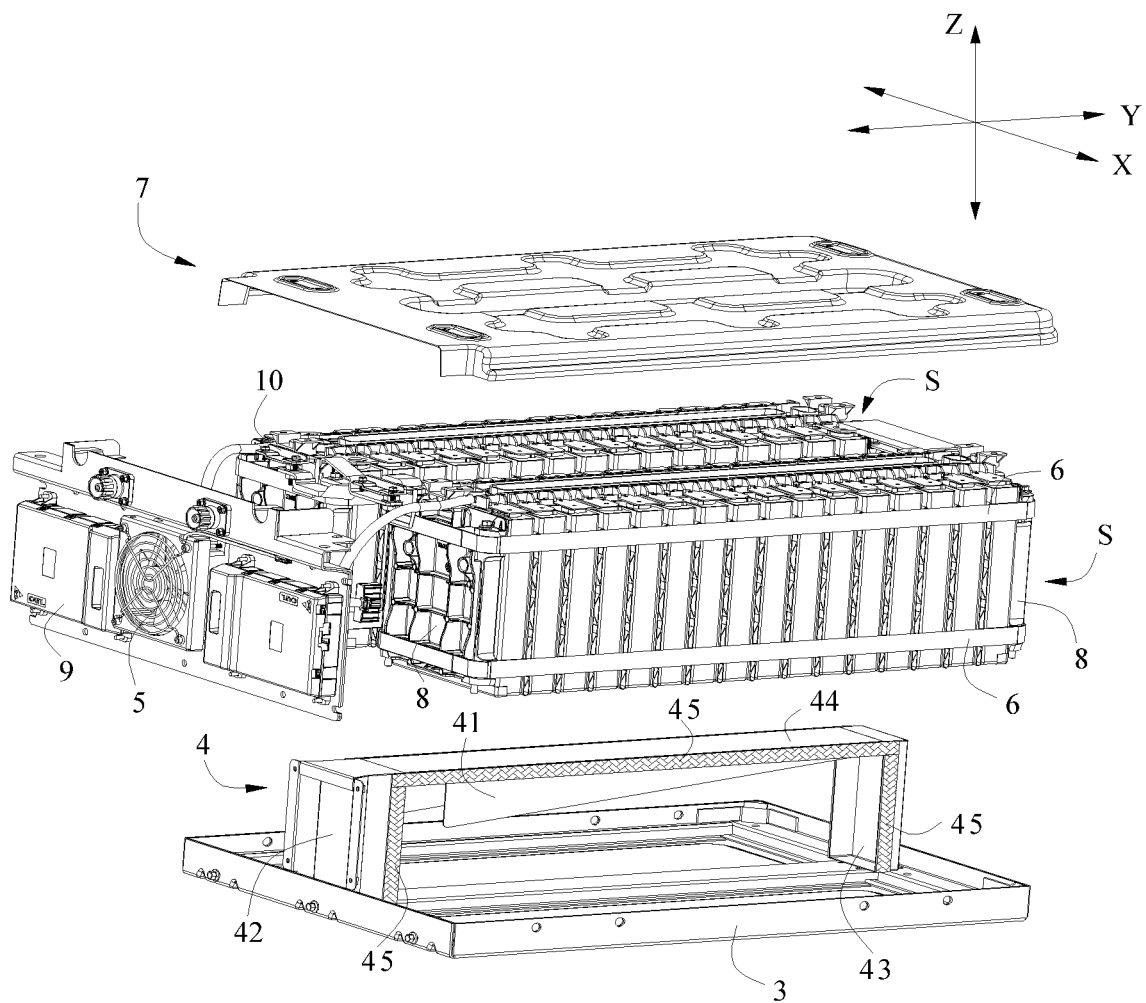
FIG. 1 is an exploded view of a battery pack in an embodiment of the present application.

In order to make the objectives, technical solutions and advantages of the present application clearer, the present application will be further described in detail below in combination with the accompanying drawings and embodiments. It should be understood that specific embodiments described herein are only used to explain the present application, but not used to define the present application.

In description of the present application, unless explicitly indicated and defined otherwise, the terms "first" and "second" are only used for the purpose of description but cannot be understood as indicating or implying relative importance; the term "multiple" refers to two and more (including two); unless otherwise indicated or stated, the term "connection" should be broadly understood, for example, the "connection" can be a fixed connection, or can also be a detachable connection, or an integrated connection, or an electrical connection, or a signal connection; the "connection" can be a direct connection, or an indirect connection through an intermediate medium. For those of ordinary skill in the art, specific meanings of the above terms in the present application can be understood according to specific situations.

In description of the specification, it should be understood that the location words such as "up", "down" and others described in the embodiments of the present application are described from the perspective shown in the accompanying drawings, and should not be understood as a limitation of the embodiments of the present application. The present application is further described in detail through specific embodiments and in combination with the accompanying drawings.

In some embodiments, in terms of the thermal management design: at present, there are mainly two modes of water-cooling and air-cooling. Due to high costs of the water-cooling, the battery pack generally adopts the air-cooling mode for heat dissipation.

In some embodiments, in terms of the expansion force design: during charging and discharging processes of the battery pack, the batteries will gradually expand and generate interaction forces (that is, expansion forces) with a fixed structure. Appropriate expansion forces will be beneficial to the batteries' own reactions, but excessive expansion forces will cause a lithium precipitation phenomenon due to too much pressure on the batteries, and even produce an irreversible capacity loss, thus greatly reducing the battery life.

In some embodiments, in order to alleviate the expansion force, currently, there are mainly the following several manners: (1) the batteries are directly attached to each other closely, and an external structure is strengthened to directly resist the expansion forces, while disadvantages of this mode are: when battery capacity and the number of strings of battery groups gradually increase, the expansion forces of the grouped batteries will become larger and larger, thus reducing the service life of the batteries; (2) a structure such as a buffer pad is added between the batteries, and absorbs the expansion forces through its material's own expansion and contraction characteristics, thereby reducing the expansion forces after the grouping, while disadvantages of this mode are: large surfaces of the batteries are closely attached to the buffer pad, and only sides and bottoms of the batteries can be used for heat dissipation, thus reducing heat dissipation efficiency; (3) a battery is separated from a battery, and there is a gap in the middle so that the batteries expand freely, while disadvantages of this mode are: the batteries are initially in free expansion, and an insufficient reaction easily occurs under no pressure, the service life is reduced, and meanwhile, if the expansion of the batteries is large and reserved gaps are too large, the group volume will be affected.

With reference to FIG. 1 to FIG. 31, a battery pack in an embodiment of the present application includes a temperature control component 1, multiple batteries 2, a lower box 3, an air duct component 4, a fan 5, a cable tie 6, an upper box cover 7, an end plate 8, an installation panel 9 and a harness isolation plate 10.

With reference to FIG. 2, FIG. 9, FIG. 10, FIG. 24 and FIG. 25, the multiple batteries 2 include a first battery 2A and a second battery 2B, and the temperature control component 1 is disposed between the first battery 2A and the second battery 2B. Further, both the first battery 2A and the second battery 2B may be multiple in number, the multiple first batteries 2A and the multiple second batteries 2B can be alternately arranged in a longitudinal direction Y, and the temperature control component 1 can be disposed between each first battery 2A and each second battery 2B which are adjacent.

In order to ensure strength and thermal conductivity of the temperature control component 1, the temperature control component 1 can be made of a metal material, such as an aluminum profile.

With reference to FIG. 3 to FIG. 8, FIG. 11 to FIG. 15, FIG. 17 to FIG. 20, FIG. 22, and FIG. 26 to FIG. 30, the temperature control component 1 may include a first side plate 11, a second side plate 12, a first buffer plate 13, a first connection plate 15 and a second connection plate 16. Among them, the first side plate 11, the second side plate 12, the first buffer plate 13, the first connection plate 15 and the second connection plate 16 can be integrally formed with an aluminum extrusion process.

The first side plate 11 is disposed opposite to the second side plate 12 in the longitudinal direction Y, and the second side plate 12 is connected with the first side plate 11 via the first connection plate 15 and the second connection plate 16. The first side plate 11 and the second side plate 12 are disposed directly facing large surfaces of corresponding batteries 2, and when external air flows through the temperature control component 1, heat dissipation treatment of the batteries 2 can be realized.

The first connection plate 15 connects one end of the first side plate 11 and one end of the second side plate 12, and the second connection plate 16 connects the other end of the first side plate 11 and the other end of the second side plate 12, so that the first side plate 11, the second side plate 12, the first connection plate 15 and the second connection plate 16 together form a surrounding frame structure with a cavity.

The first buffer plate 13 is disposed between the second side plate 12 and the first side plate 11 and is connected with the second side plate 12 and the first side plate 11 to divide the cavity into multiple channels F, and at least part of the first buffer plate 13 extends obliquely from the first side plate 11 towards the second side plate 12. The first buffer plate 13 may be multiple in number, and the first buffer plates 13 are spaced apart in an up-down direction Z to divide the cavity into multiple channels F.

During use of the battery pack, the batteries 2 will generate expansion forces. At this time, expansion forces of two adjacent batteries 2 (that is, the first battery 2A and the second battery 2B) will extrude the first side plate 11 and the second side plate 12 respectively, while the first side plate 11 and the second side plate 12 transmit the expansion forces to the first buffer plate 13. Since at least part of the first buffer plate 13 extends obliquely from the first side plate 11 towards the second side plate 12, the expansion forces transmitted to the first buffer plate 13 via the first side plate 11 and the second side plate 12 are greatly reduced, thereby the service life of the temperature control component 1 could be extended. Moreover, the at least part of the first buffer plate 13 which extends obliquely is more prone to a bending deformation under the action of the expansion forces, so that the temperature control component 1 could absorb the expansion forces of the batteries 2 in time, thereby the service life of the batteries 2 could be greatly improved.

The size of an angle formed by an extension direction of the first buffer plate 13 (that is, a direction in which the at least part of the first buffer plate 13 extends) and the first side plate 11 and the size of an angle formed by the extension direction of the first buffer plate 13 and the second side plate 12 determine the amplitude of the expansion forces transmitted to the first buffer plate 13 via the first side plate 11 and the second side plate 12. If the expansion forces applied to the first buffer plate 13 are too large, the first buffer plate 13 will be broken. Therefore, in order to prevent the first buffer plate 13 from being broken by excessive expansion forces, in an implementation, with reference to FIG. 8, FIG. 15 and FIG. 20, an acute angle $\theta_1$ formed by the extension direction of the first buffer plate 13 and the first side plate 11 is not more than 45° (an acute angle formed by the first buffer plate 13 and the second side plate 12 is equal to the acute angle formed by the first buffer plate 13 and the first side plate 11).

Several specific structures of the temperature control component 1 are described in detail below based on the arrangement of the first buffer plate 13.

In a first embodiment (not shown), only the first buffer plate 13 is disposed between the first side plate 11 and the second side plate 12 of the temperature control component 1, and the first buffer plate 13 is formed by extending, in entirety, obliquely from the first side plate 11 towards the second side plate 12. Specifically, the first buffer plate 13 can be formed by extending, in entirety, in an oblique upward direction from the first side plate 11 towards the second side plate 12, or the first buffer plate 13 can be formed by extending, in entirety, in an oblique downward direction from the first side plate 11 towards the second side plate 12. In the first embodiment, the first buffer plate 13 may be formed into a flat plate structure or an arc-shaped plate structure. The first buffer plate 13 may be formed into a structure which has a uniform thickness; or, the first buffer plate 13 may be formed into a structure which is thick in the middle and thin at both ends; or, the first buffer plate 13 may be formed into a structure which is thin in the middle and thick at both ends.

Figure 3:
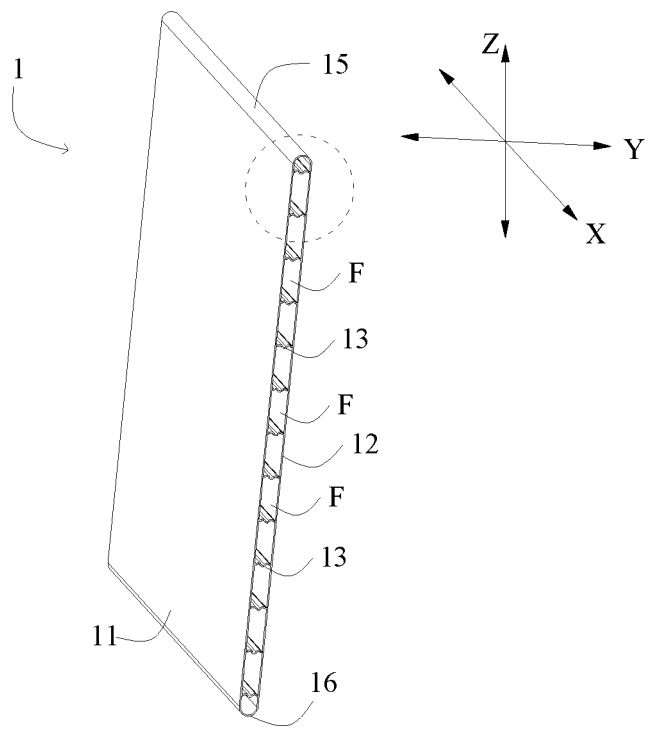
FIG. 3 is a perspective view of a temperature control component in FIG. 2.
Figure 4:
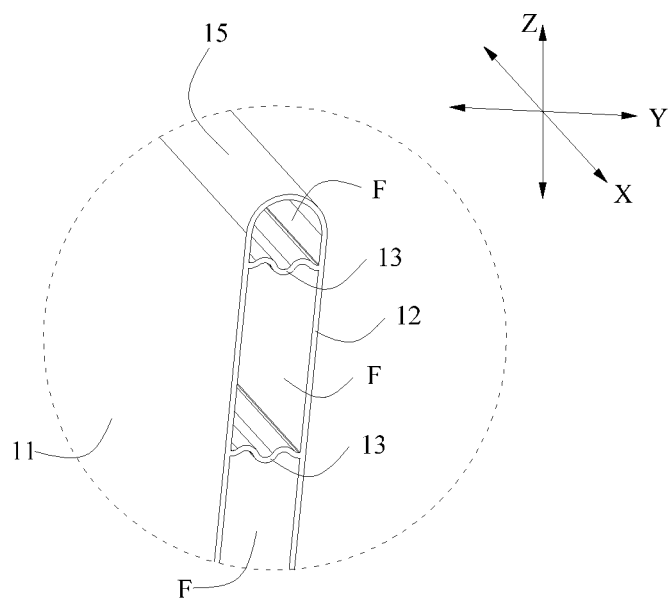
FIG. 4 is an enlarged view of a circle part in FIG. 3.

In a second embodiment, with reference to FIG. 3 and FIG. 4, only the first buffer plate 13 is disposed between the first side plate 11 and the second side plate 12 of the temperature control component 1, and at this time, the first buffer plate 13 can be formed into a wave-shaped structure (also known as a corrugated plate structure). In other words, the first buffer plate 13 is formed by alternately extending in an oblique upward direction from the first side plate 11 towards the second side plate 12 and an oblique downward direction from the first side plate 11 towards the second side plate 12.

The first buffer plate 13 of this structure is formed with protrusions, and each protrusion is formed into an arc-shaped structure. Based on the shape structure of each protrusion, the first buffer plate 13 has sufficient space for a bending deformation, so that the temperature control component 1 could absorb the expansion forces of the batteries 2 in time, which would greatly improve the service life of the batteries 2.

In a third embodiment, with reference to FIG. 5 to FIG. 8, FIG. 11, FIG. 13, FIG. 14, FIG. 18, FIG. 19, FIG. 26, FIG. 28 and FIG. 29, the first buffer plate 13 is formed by extending, in entirety, obliquely upward from the first side plate 11 towards the second side plate 12, and the temperature control component 1 also includes a second buffer plate 14. The second buffer plate 14 is disposed between the second side plate 12 and the first side plate 11 and is connected with the second side plate 12 and the first side plate 11, and the second buffer plate 14 is formed by extending obliquely downward from the first side plate 11 towards the second side plate 12. The second buffer plate 14 is used to absorb the expansion forces of the batteries 2 together with the first buffer plate 13, thereby the service life of the batteries 2 could be greatly improved.

The second buffer plate 14 may be multiple in number, and the multiple second buffer plates 14 are spaced apart in the up-down direction Z to divide the cavity into multiple channels F together with the first buffer plate 13.

The size of an angle formed by an extension direction of the second buffer plate 14 and the first side plate 11 and the size of an angle formed by the extension direction of the second buffer plate 14 and the second side plate 12 determine the amplitude of expansion forces transmitted to the second buffer plate 14 via the first side plate 11 and the second side plate 12. If the expansion forces applied to the second buffer plate 14 are too large, the second buffer plate 14 will be broken. Therefore, in order to prevent the second buffer plate 14 from being broken by excessive expansion forces, in an implementation, with reference to FIG. 8, FIG. 20 and FIG. 30, an acute angle $\theta_2$ formed by the extension direction of the second buffer plate 14 and the first side plate 11 is not more than 45° (an acute angle formed by the second buffer plate 14 and the second side plate 12 is equal to the acute angle formed by the second buffer plate 14 and the first side plate 11).

With reference to FIG. 5 to FIG. 8, FIG. 11, FIG. 13, FIG. 14, FIG. 18, FIG. 19, FIG. 26, FIG. 28 and FIG. 29, the second buffer plate 14 is spaced apart from the first buffer plate 13 in the up-down direction Z, and the first buffer plate 13 and the second buffer plate 14 are arranged in a staggered manner. At this time, the first buffer plate 13 and the second buffer plate 14 are formed into a "八"-shaped structure. The "八"-shaped structure could ensure structural stability of the temperature control component 1 and improve structural strength of the temperature control component 1.

Figure 6:
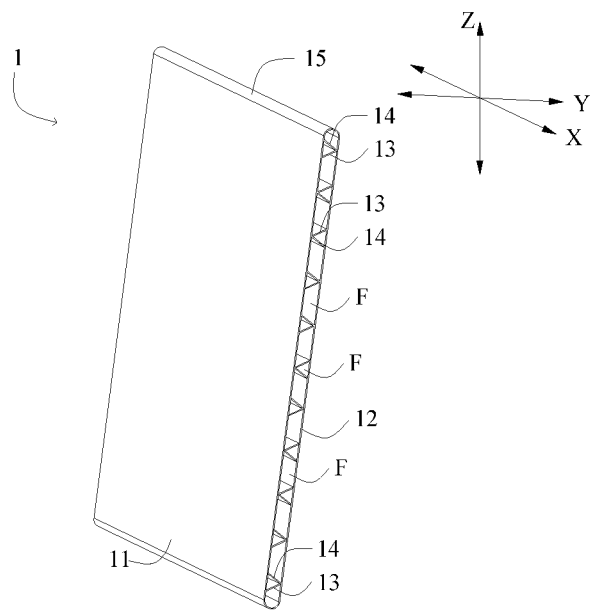
FIG. 6 is a variant embodiment of FIG. 5.
Figure 11:
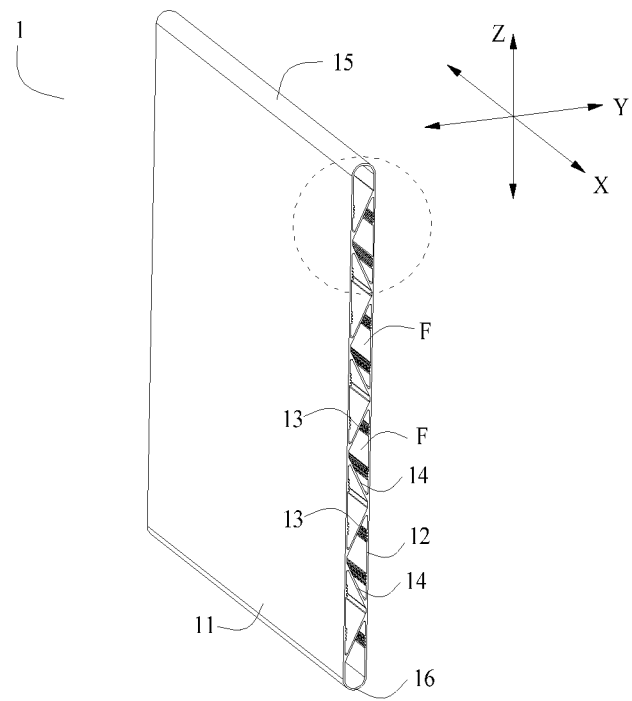
FIG. 11 is a perspective view of the temperature control component in FIG. 9.
Figure 12:
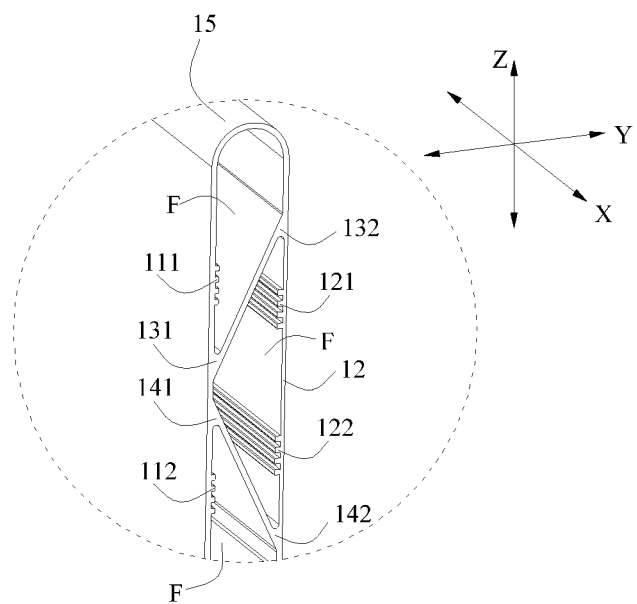
FIG. 12 is an enlarged view of a circle part in FIG. 11.

With reference to FIG. 6 and FIG. 11, the second buffer plate 14 is directly connected with the first buffer plate 13; and the first buffer plate 13, the second buffer plate 14 and a corresponding part of the first side plate 11 form a triangular structure, and the first buffer plate 13, the second buffer plate 14 and a corresponding part of the second side plate 12 also form a triangular structure. Such triangular structure could ensure the structural stability of the temperature control component 1 and improve the structural strength of the temperature control component 1.

Figure 7:
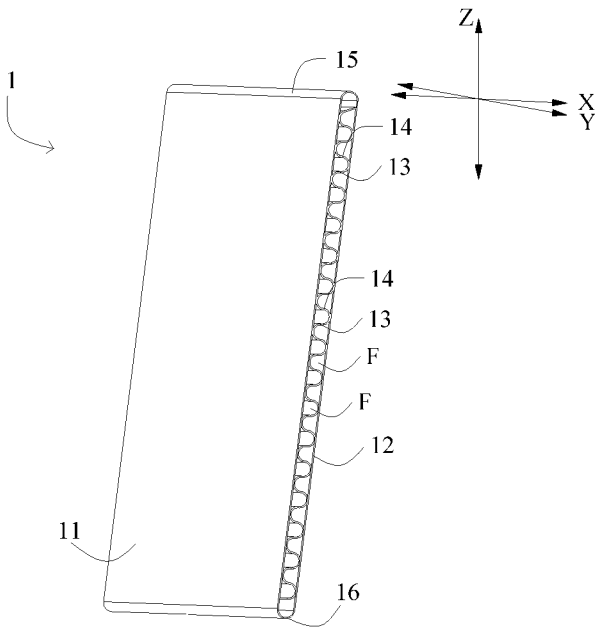
FIG. 7 is another variant embodiment of FIG. 5.

With reference to FIG. 7, the second buffer plate 14 is directly connected with the first buffer plate 13, and the first buffer plate 13 and the second buffer plate 14 are formed into an arch structure. Such arch structure could ensure the structural stability of the temperature control component 1 and improve the structural strength of the temperature control component 1.

Figure 5:
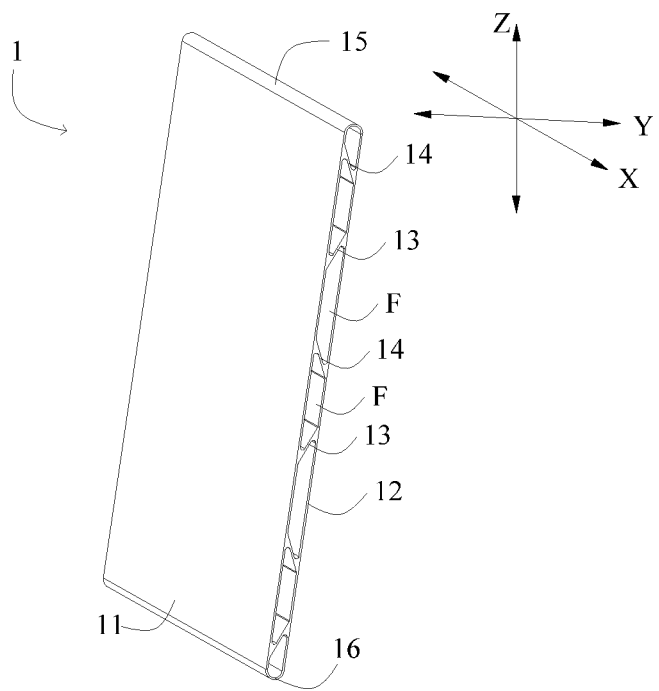
FIG. 5 is a perspective view of a temperature control component in FIG. 1.
Figure 8:
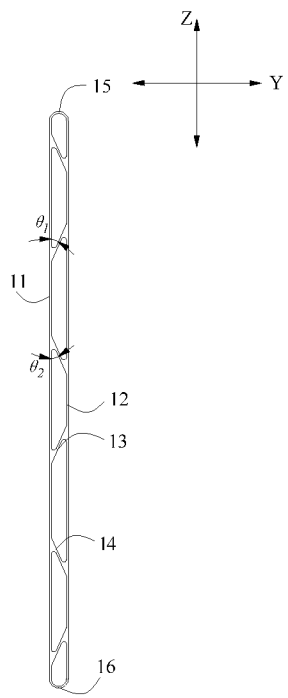
FIG. 8 is a front view of FIG. 5.
Figure 9:
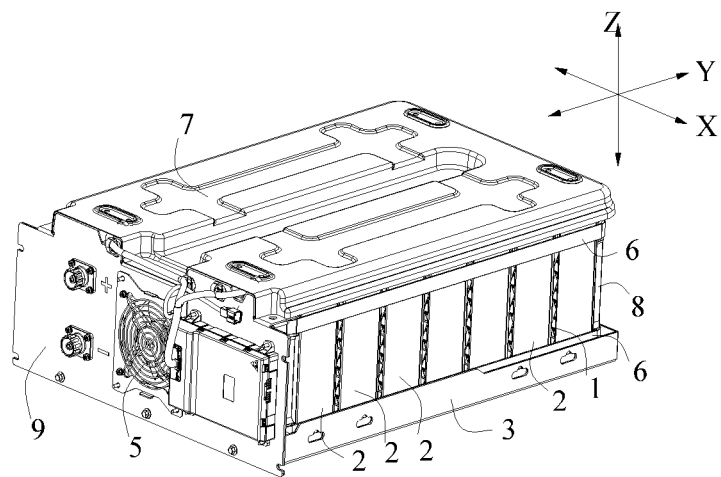
FIG. 9 is a perspective view of a battery pack in an embodiment of the present application.
Figure 10:
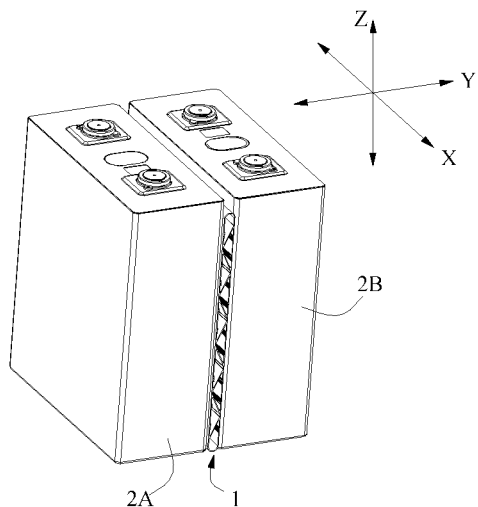
FIG. 10 is a schematic view of a positional relationship between two adjacent batteries and a corresponding temperature control component in FIG. 9.

In the third embodiment, the first buffer plate 13 and the second buffer plate 14 may be formed into a structure which has a uniform thickness (as shown in FIG. 6 and FIG. 7). Or, the first buffer plate 13 and the second buffer plate 14 may be formed into a structure which is thick in the middle and thin at both ends. Or, the first buffer plate 13 and the second buffer plate 14 may be formed into a structure which is thin in the middle and thick at both ends (as shown in FIG. 5 and FIG. 8). The first buffer plate 13 and the second buffer plate 14 may be formed into a flat plate structure (as shown in FIG. 6) or an arc-shaped plate structure (as shown in FIG. 7).

With reference to FIG. 12, FIG. 15, FIG. 16, FIG. 17, FIG. 20, FIG. 21 and FIG. 22, in the battery pack of the present application, the first side plate 11 may be provided with: a first limit protrusion 111, extending towards the second side plate 12 in the longitudinal direction Y and located within a corresponding channel F, and the first limit protrusion 111 is situated within a projection area of the first buffer plate 13 on the first side plate 11. The second side plate 12 may be provided with: a second limit protrusion 121, extending towards the first side plate 11 in the longitudinal direction Y and located within a corresponding channel F, and the second limit protrusion 121 is situated within a projection area of the first buffer plate 13 on the second side plate 12.

Figure 16:
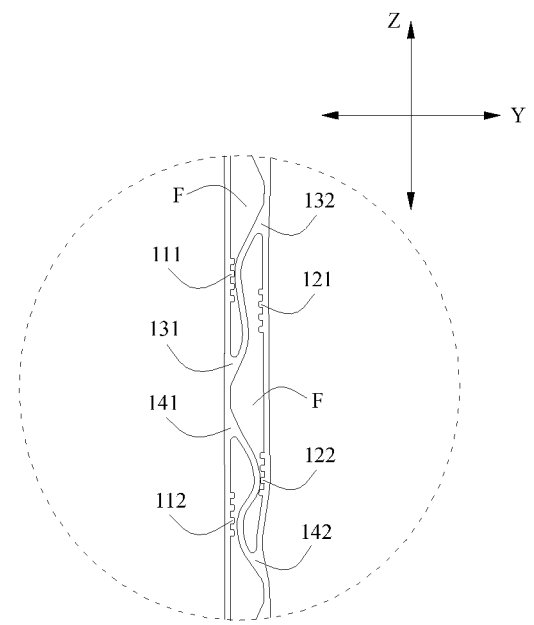
FIG. 16 is an enlarged view of a circle part in FIG. 14.
Figure 21:
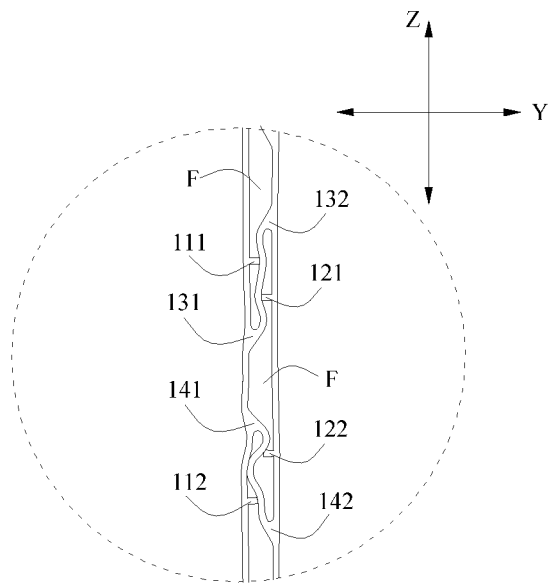
FIG. 21 is an enlarged view of a circle part in FIG. 19.

During a bending deformation of the first buffer plate 13, due to the arrangement of the first limit protrusion 111 and the second limit protrusion 121, the first buffer plate 13 will finally lean against the first limit protrusion 111 and the second limit protrusion 121 (as shown in FIG. 16 and FIG. 21). As a result, the bending deformation of the first buffer plate 13 is restricted, and the corresponding channel F still has a ventilation space to meet thermal management requirements, thus thermal management performance of the temperature control component 1 to the batteries 2 could be improved, and the service life of the batteries 2 could be greatly improved.

The first limit protrusion 111 is disposed opposite to the second limit protrusion 121. Specifically, the first limit protrusion 111 is flush with the second limit protrusion 121 in the longitudinal direction Y; or, the first limit protrusion 111 and the second limit protrusion 121 are staggered in the up-down direction Z.

In order to ensure the anti-extrusion strength of the first side plate 11 and the second side plate 12, the number of the first limit protrusion 111 and the number of the second limit protrusion 121 can be selectively set according to strength requirements. Specifically, with reference to FIG. 18 to FIG. 22, the first limit protrusion 111 of the first side plate 11 may be one in number. With reference to FIG. 12 to FIG. 17, the first limit protrusion 111 may be multiple in number. Similarly, the second limit protrusion 121 may also be one (as shown in FIG. 18 to FIG. 22) or multiple (as shown in FIG. 12 to FIG. 17) in number.

The first buffer plate 13 has a length of L and has a first end 131 and a second end 132; the first end 131 is connected with the first side plate 11, and the second end 132 is connected with the second side plate 12.

Figure 15:
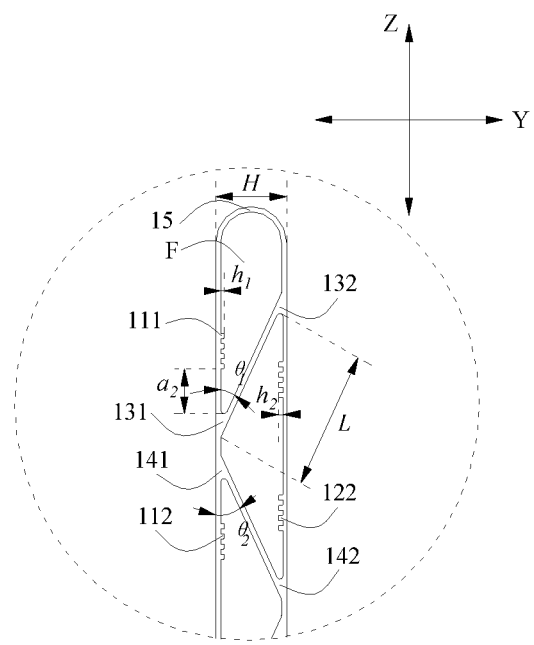
FIG. 15 is an enlarged view of a circle part in FIG. 13, where a distance $a_2$ between multiple first limit protrusions and a first end of a first buffer plate in an up-down direction is illustrated.
Figure 20:
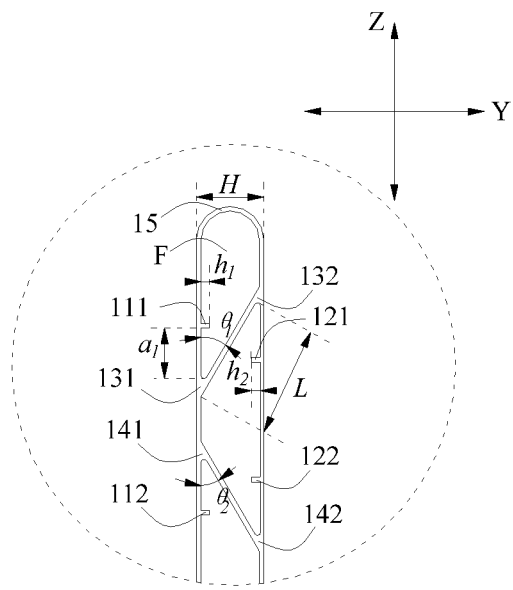
FIG. 20 is an enlarged view of a circle part in FIG. 18, where a distance $a_1$ between a first limit protrusion and a first end of a first buffer plate in an up-down direction is illustrated.

When the first limit protrusion 111 is one in number (as shown in FIG. 20), a distance between the first limit protrusion 111 and the first end 131 in the up-down direction Z is $a_1$ (that is, a distance between an edge of the first end 131 close to the first limit protrusion 111 and an edge of the first limit protrusion 111 close to the first end 131), and $0<a_1 \leq L/2$. When the first limit protrusion 111 is multiple in number (as shown in FIG. 15), a distance between the multiple first limit protrusions 111 and the first end 131 in the up-down direction Z is $a_2$ (that is, a distance between an edge of the first end 131 close to the first limit protrusions 111 and an edge of one of the first limit protrusions 111 closest to the first end 131), and $0<a_2 \leq L/2$.

Here, the size of the parameter $a_1$ (or $a_2$) determines a disposed position of the first limit protrusion 111 on the first side plate 11. In order to ensure a position limiting effect of the first limit protrusion 111 on the first buffer plate 13, the first limit protrusion 111 needs to be disposed between a position at which a maximum free deformation arc of the first buffer plate 13 is tangent to the first side plate 11 and the first end 131, that is $0<a_1 \leq L/2$ (or $0<a_2 \leq L/2$). However, when $a_1 > L/2$ (or $a_2 > L/2$), due to a limited degree of bending deformation of the first buffer plate 13, the first limit protrusion 111 has difficulty in or even is incapable of performing a limiting effect to the bending deformation of the first buffer plate 13.

Figure 17:
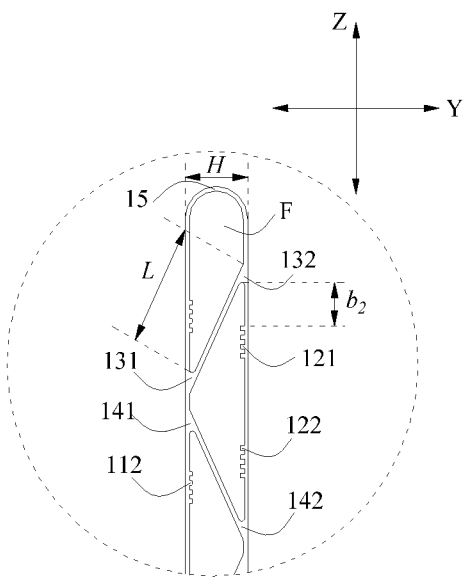
FIG. 17 is an enlarged view of a circle part in FIG. 13, where a distance $b_2$ between multiple second limit protrusions and a second end of the first buffer plate in an up-down direction is illustrated.
Figure 18:
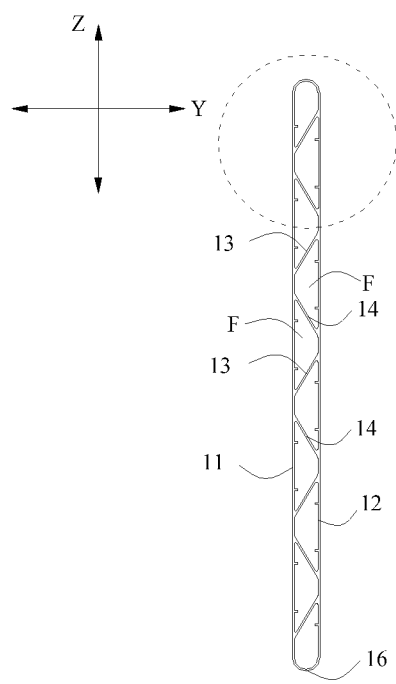
FIG. 18 is a variant embodiment of FIG. 13, where a temperature control component is in an undeformed state.
Figure 22:
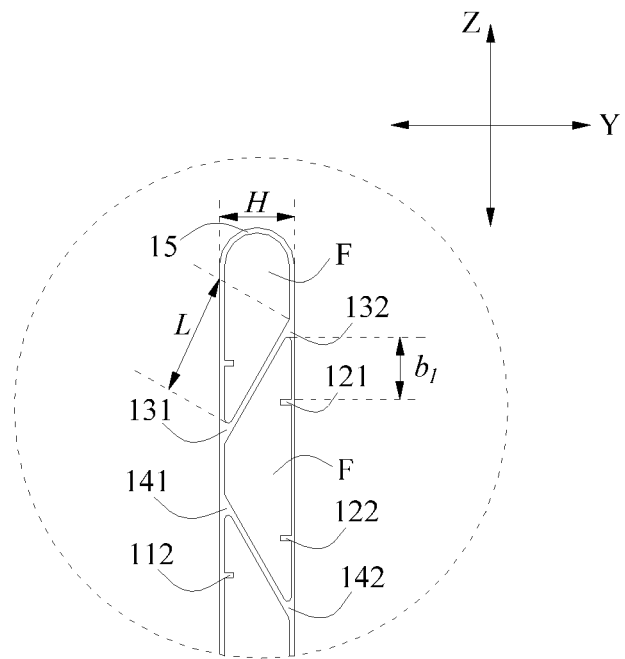
FIG. 22 is an enlarged view of a circle part in FIG. 18, where a distance $b_1$ between a second limit protrusion and a second end of the first buffer plate in an up-down direction is illustrated.
Figure 23:
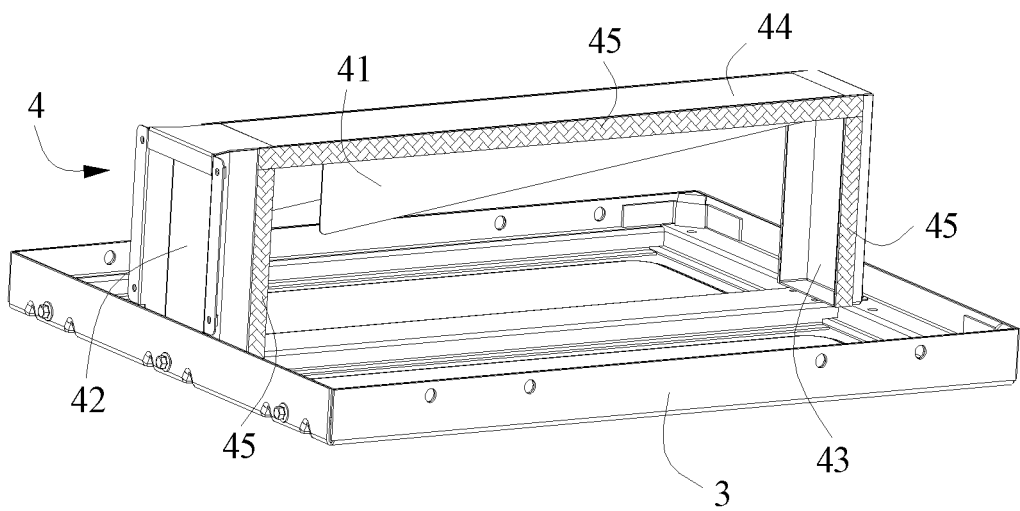
FIG. 23 is an assembly diagram of an air duct component and a lower box in an embodiment of the present application.
Figure 24:
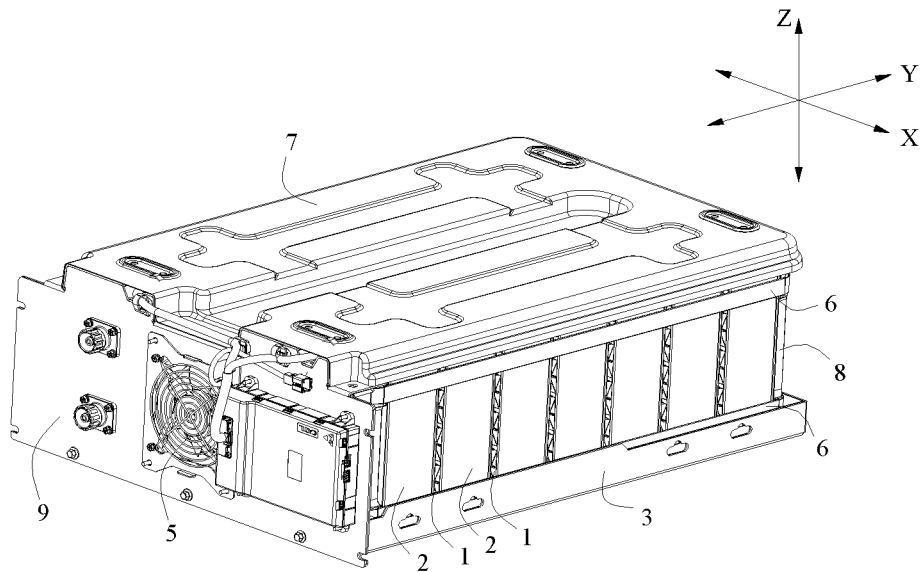
FIG. 24 is a perspective view of a battery pack in an embodiment of the present application.
Figure 25:
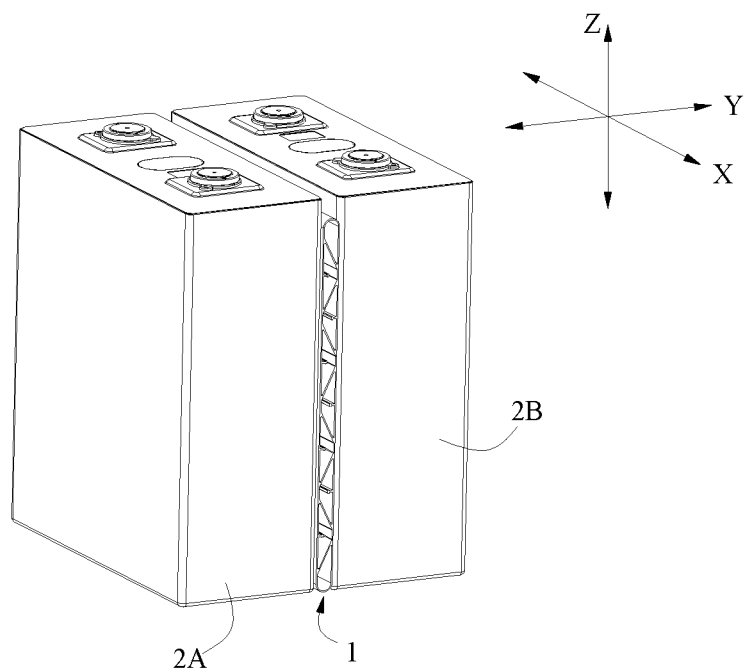
FIG. 25 is a schematic view of a positional relationship between two adjacent batteries and a corresponding temperature control component in FIG. 24.
Figure 26:
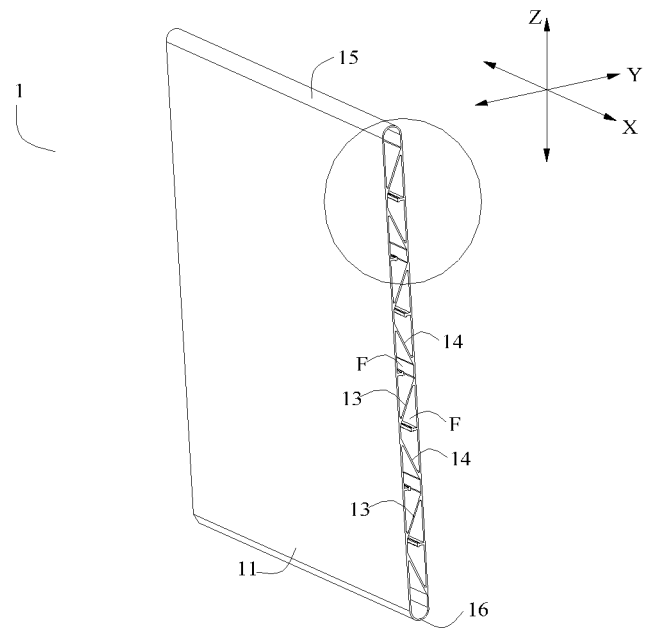
FIG. 26 is a perspective view of a temperature control component in an embodiment of the present application.

When the second limit protrusion 121 is one in number (as shown in FIG. 22), a distance between the second limit protrusion 121 and the second end 132 in the up-down direction Z is $b_1$ (that is, a distance between an edge of the second end 132 close to the second limit protrusion 121 and an edge of the second limit protrusion 121 close to the second end 132), and $0<b_1 \leq L/2$. When the second limit protrusions 121 is multiple in number (as shown in FIG. 17), a distance between the multiple second limit protrusions 121 and the second end 132 in the up-down direction Z is $b_2$ (that is, a distance between an edge of the second end 132 close to the second limit protrusions 121 and an edge of one of the second limit protrusions 121 closest to the second end 132), and $0<b_2 \leq L/2$.

Here, the size of the parameter $b_1$ (or $b_2$) determines a disposed position of the second limit protrusion 121 on the second side plate 12. In order to ensure a position limiting effect of the second limit protrusion 121 on the first buffer plate 13, the second limit protrusion 121 needs to be disposed between a position at which a maximum free deformation arc of the first buffer plate 13 is tangent to the second side plate 12 and the second end 132, that is $0<b_1 \leq L/2$ (or $0<b_2 \leq L/2$). However, when $b_1 > L/2$ (or $b_2 > L/2$), due to a limited degree of bending deformation of the first buffer plate 13, the second limit protrusion 121 has difficulty in or even is incapable of performing a limiting effect to the bending deformation of the first buffer plate 13.

With reference to FIG. 15 and FIG. 20, the temperature control component 1 has a thickness of H in the longitudinal direction Y, the first limit protrusion 111 has a height of $h_1$ in the longitudinal direction Y, and $0<h_1 \leq H/2$; the second limit protrusion 121 has a height of $h_2$ in the longitudinal direction Y, and $0<h_2 \leq H/2$. This is because, if $h_1 > H/2$ (or $h_2 > H/2$), the first buffer plate 13 generates a very small degree of bending deformation during expansion deformations of the batteries 2, which cannot absorb the expansion deformations of the batteries 2 in time, so that the temperature control component 1 cannot meet expansion force requirements of the batteries 2.

Further, when the first limit protrusion 111 is one in number, $H/8 \leq h_1 \leq H/2$; and when the first limit protrusion 111 is multiple in number, the multiple first limit protrusions 111 have the same height, and $H/20 \leq h_1 \leq H/8$.

It should be noted that when there is only one first limit protrusion 111, a contact between the first buffer plate 13 subjected to the bending deformation and the first limit protrusion 111 is equivalent to a point contact. At this time, the degree of the bending deformation of the first buffer plate 13 is relatively small. If the first limit protrusion 111 intends to play a position limiting effect on the first buffer plate 13, its height $h_1$ in the longitudinal direction Y cannot be too small, that is $H/8 \leq h_1 \leq H/2$. When the first limit protrusion 111 is multiple in number, a contact between the first buffer plate 13 subjected to the bending deformation and the multiple first limit protrusions 111 is equivalent to a plane contact. At this time, the degree of the bending deformation of the first buffer plate 13 is relatively large, and the height $h_1$ of the multiple first limit protrusions 111 in the longitudinal direction Y can be appropriately reduced, that is $H/20 \leq h_1 \leq H/8$.

Similarly, when the second limit protrusion 121 is one in number, $H/8 \leq h_2 \leq H/2$, and when the second limit protrusion 121 is multiple in number, the multiple second limit protrusions 121 have the same height, and $H/20 \leq h_2 \leq H/8$. For the number of the second limit protrusions 121 and their height $h_2$ in the longitudinal direction Y, reasons for using the above arrangement are consistent with those for the first limit protrusions 111, which will not be described in detail here.

In some embodiments (not shown), the first limit protrusion 111 and the second limit protrusion 121 can be disposed in an embodiment with only the first buffer plate 13, for example, the above-mentioned first embodiment. Of course, the first limit protrusion 111 and the second limit protrusion 121 may also be disposed in an embodiment with both the first buffer plate 13 and the second buffer plate 14, for example, the above-mentioned third embodiment, where the second buffer plate 14 can be formed into a flat plate structure or an arc-shaped structure, and the second buffer plate 14 is used to absorb the expansion deformations of the batteries 2 together with the first buffer plate 13, thereby it could be ensured that the temperature control component 1 meets expansion force requirements of the batteries 2, and the service life of the batteries 2 could be improved.

Figure 13:
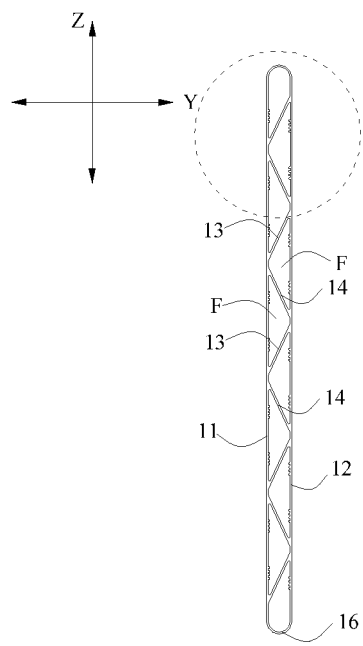
FIG. 13 is a front view of FIG. 11, where the temperature control component is in an undeformed state.
Figure 14:
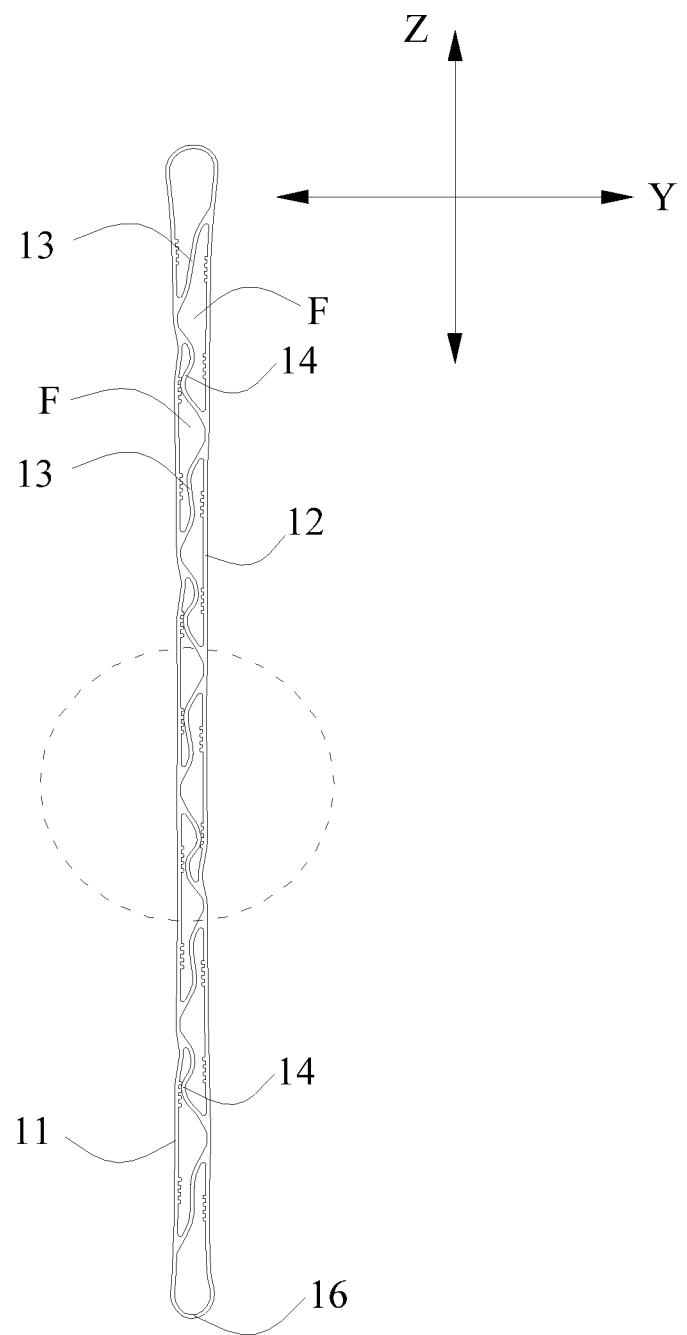
FIG. 14 is a deformed state of the temperature control component in FIG. 13.
Figure 19:
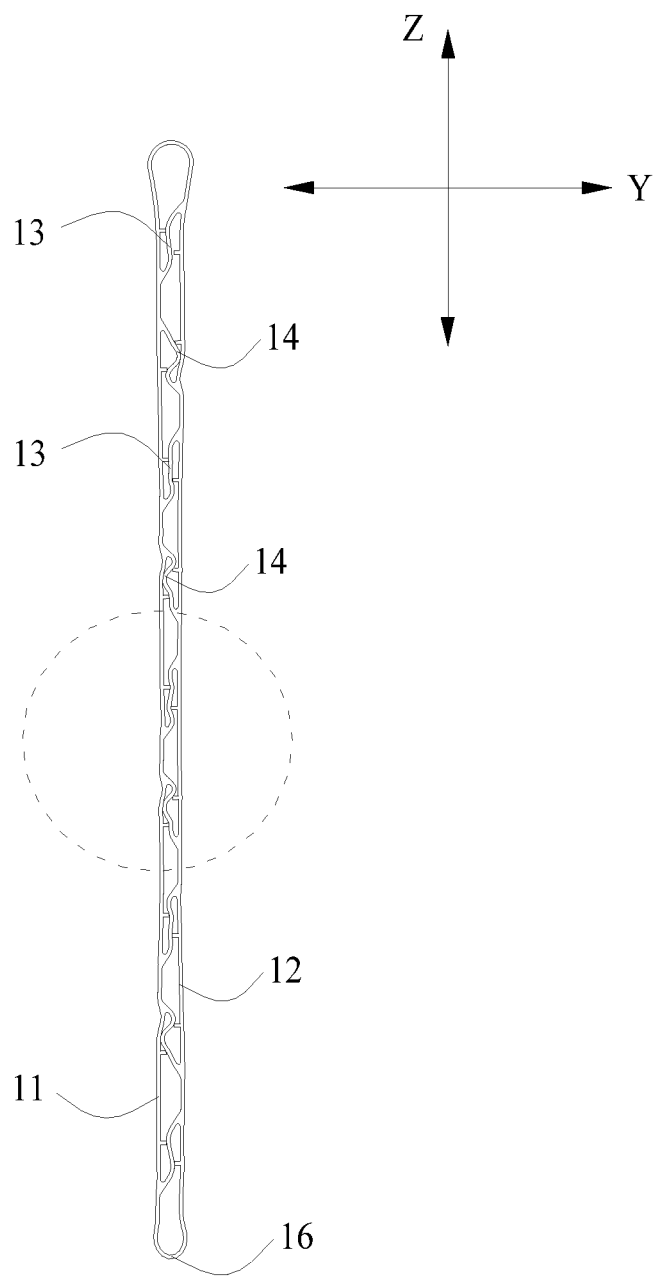
FIG. 19 is a deformed state of the temperature control component in FIG. 18.

With reference to FIG. 13 and FIG. 19, the second buffer plate 14 can be spaced apart from the first buffer plate 13 in the up-down direction Z. At this time, the second buffer plate 14, the first buffer plate 13, the first side plate 11 and the second side plate 12 enclose a trapezoid channel F.

The second buffer plate 14 can be directly connected with the first buffer plate 13. At this time, the second buffer plate 14, the first buffer plate 13 and the first side plate 11 enclose a triangular channel F, and the second buffer plate 14, the first buffer plate 13 and the second side plate 12 also enclose a triangular channel F.

The first side plate 11 may also be provided with: a third limit protrusion 112 extending towards the second side plate 12 in the longitudinal direction Y, and the third limit protrusion 112 is situated within a projection area of the second buffer plate 14 on the first side plate 11. The second side plate 12 may also be provided with: a fourth limit protrusion 122 extending towards the first side plate 11 in the longitudinal direction Y, and the fourth limit protrusion 122 is situated within a projection area of the second buffer plate 14 on the second side plate 12.

During a bending deformation of the second buffer plate 14, due to the arrangement of the third limit protrusion 112 and the fourth limit protrusion 122, the second buffer plate 14 will finally lean against the third limit protrusion 112 and the fourth limit protrusion 122 (as shown in FIG. 16 and FIG. 21). As a result, the bending deformation of the second buffer plate 14 is restricted, and the corresponding channel F still has a ventilation space to meet thermal management requirements, thus the thermal management performance of the temperature control component 1 to the batteries 2 could be improved, and the service life of the batteries 2 could be greatly improved.

The second buffer plate 14 has a third end 141 and a fourth end 142; the third end 141 is connected with the first side plate 11, and the fourth end 142 is connected with the second side plate 12. A positional relationship between the third limit protrusion 112 and the third end 141 is consistent with a positional relationship between the first limit protrusion 111 and the first end 131, and a positional relationship between the fourth limit protrusion 122 and the fourth end 142 is consistent with a positional relationship between the second limit protrusion 121 and the second end 132, which will not be described in detail here.

The third limit protrusion 112 is disposed opposite to the fourth limit protrusion 122. Specifically, the third limit protrusion 112 is flush with the fourth limit protrusion 122 in the longitudinal direction Y; or, the third limit protrusion 112 and the fourth limit protrusion 122 are staggered in the up-down direction Z.

In order to ensure the anti-extrusion strength of the first side plate 11 and the second side plate 12, the number of the third limit protrusion 112 and the number of the fourth limit protrusion 122 can be selectively set according to strength requirements.

In the above-mentioned third embodiment, the first side plate 11, the second side plate 12, the first buffer plate 13, the second buffer plate 14, the first connection plate 15 and the second connection plate 16 can be integrally formed with an aluminum extrusion process. Both the first buffer plate 13 and the second buffer plate 14 can be multiple in number, and the second buffer plate 14 and the first buffer plate 13 can be arranged in a staggered order. Moreover, each second buffer plate 14 and each first buffer plate 13 which are adjacent in the up-down direction Z enclose a channel F respectively with a corresponding portion of the first side plate 11 and a corresponding portion of the second side plate 12. In other words, the cavity formed by the first side plate 11, the second side plate 12, the first connection plate 15 and the second connection plate 16 together is divided into multiple channels F by the first buffer plate 13 and the second buffer plate 14.

Figure 27:
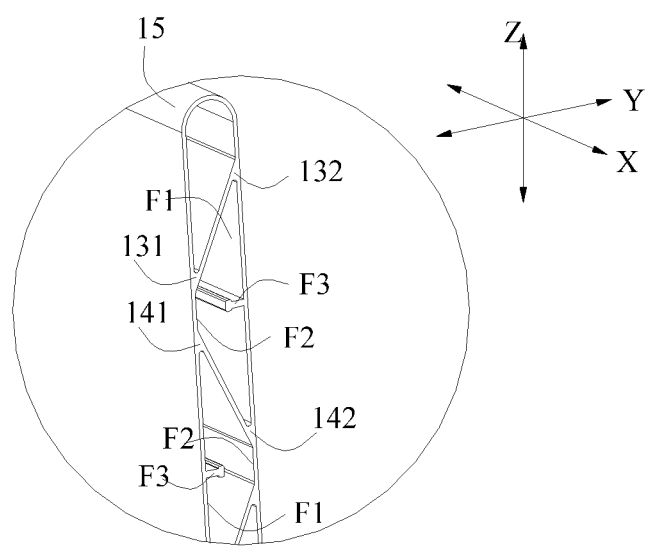
FIG. 27 is an enlarged view of a circle part in FIG. 26.
Figure 28:
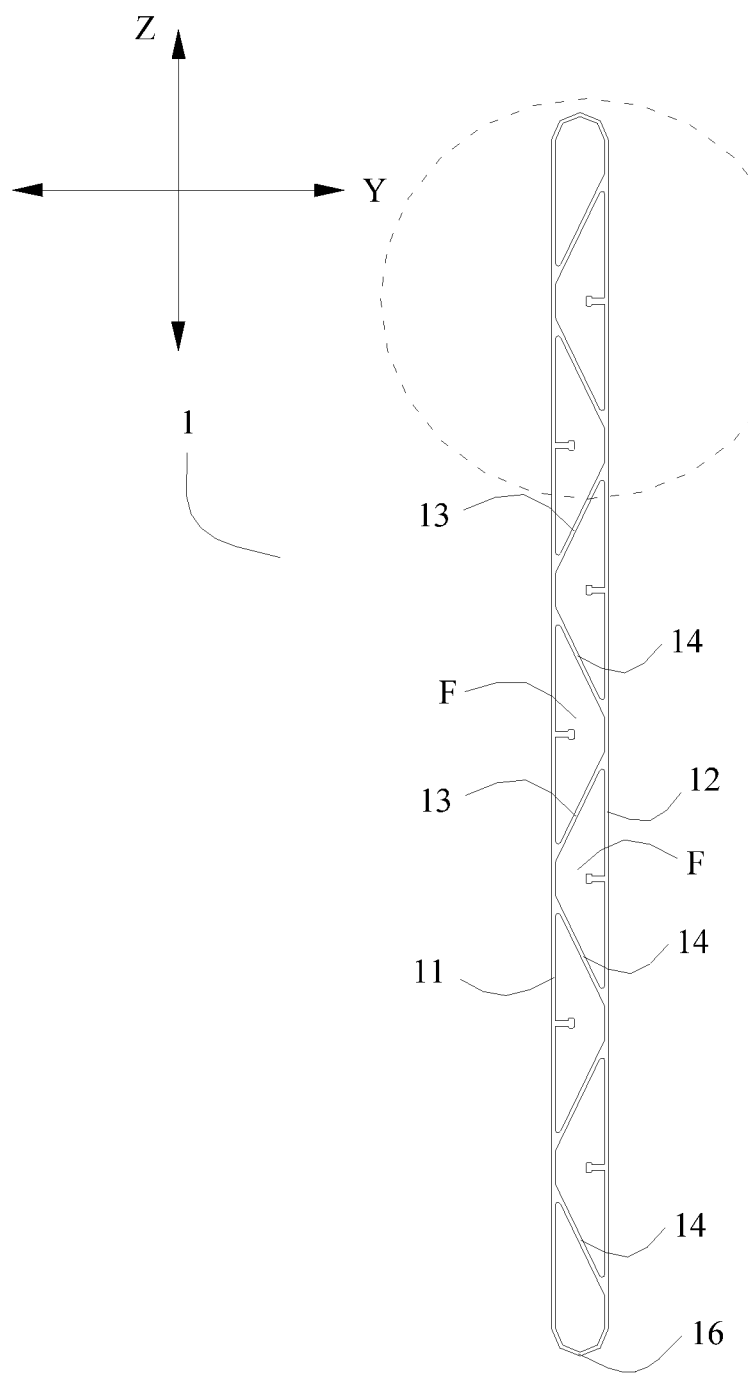
FIG. 28 is a front view of FIG. 26, where the temperature control component is in an undeformed state.
Figure 29:
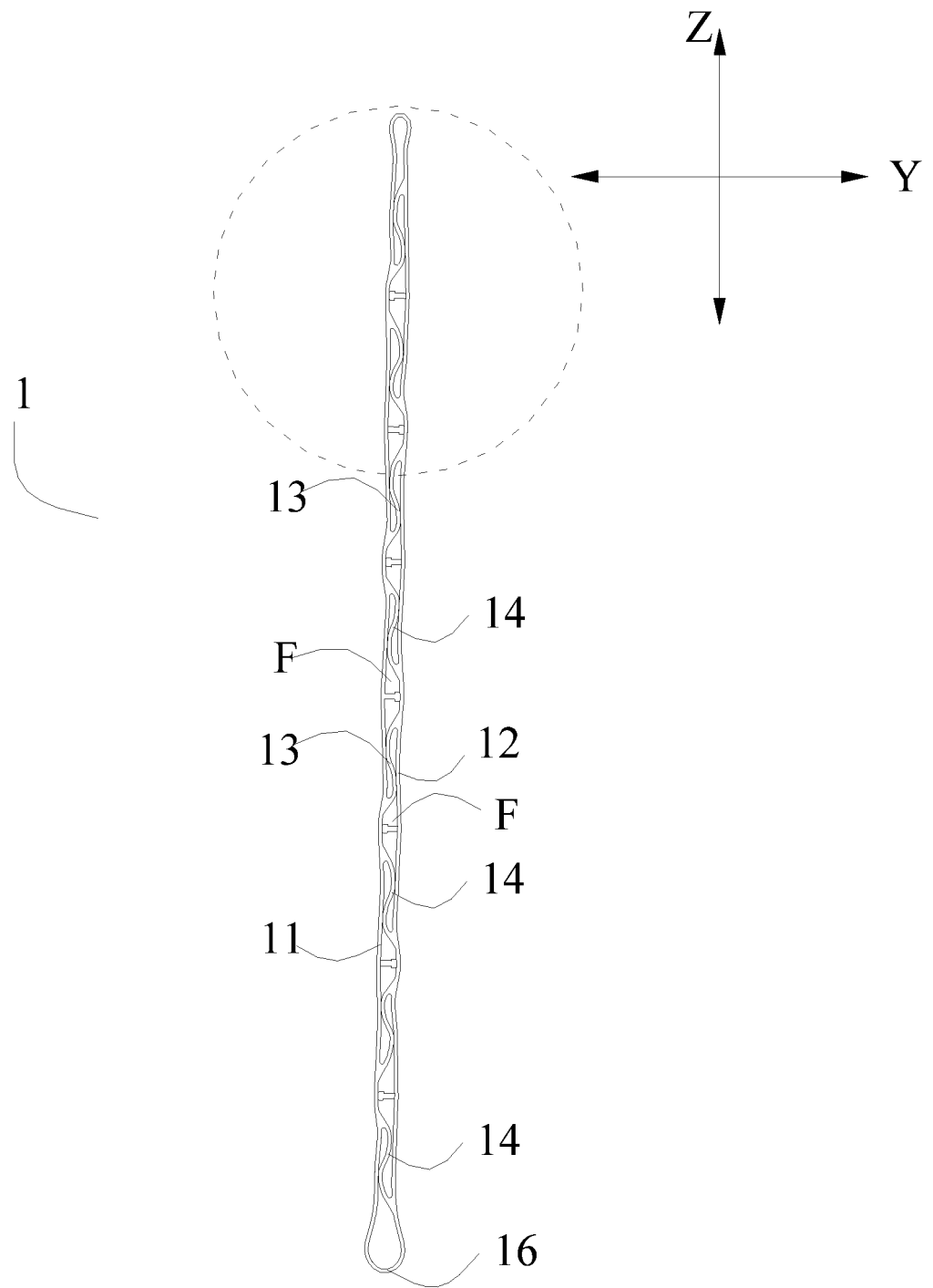
FIG. 29 is a deformed state of the temperature control component in FIG. 28.
Figure 30:
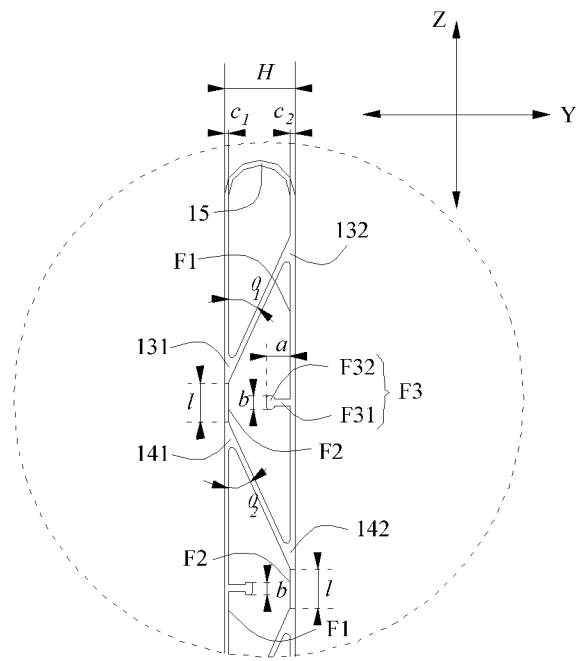
FIG. 30 is an enlarged view of a circle part in FIG. 28.
Figure 31:
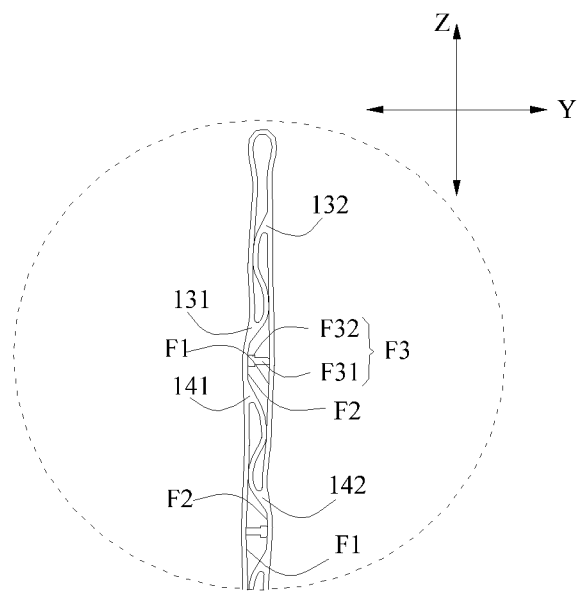
FIG. 31 is an enlarged view of a circle part in FIG. 29.

With reference to FIG. 27, FIG. 30 and FIG. 31, the channel F may have: a wide surface F1, a narrow surface F2 and a position-limiting protrusion F3; the narrow face F2 is disposed opposite to the wide surface F1 in the longitudinal direction Y, the position-limiting protrusion F3 protrudes from the wide surface F1 in the longitudinal direction Y and is spaced apart from the narrow surface F2, and at least part of the position-limiting protrusion F3 is situated within a projection area of the narrow surface F2 on the wide surface F1. The position-limiting protrusion F3 within the channel F can be one or multiple in number.

During a working process of the battery pack, the batteries 2 will generate expansion forces, and expansion forces of two adjacent batteries 2 (that is, the first battery 2A and the second battery 2B) will extrude the first side plate 11 and the second side plate 12 respectively, while the first side plate 11 and the second side plate 12 will transmit the expansion forces to the first buffer plate 13 and the second buffer plate 14. Due to the oblique arrangement of the first buffer plate 13 and the second buffer plate 14, the first buffer plate 13 and the second buffer plate 14 are prone to bending deformations under the action of the expansion forces so as to absorb the expansion forces of the batteries 2 in time, thereby it could be ensured that the temperature control component 1 meets expansion force requirements of the batteries 2. At the same time, during the bending deformations of the first buffer plate 13 and the second buffer plate 14, since the position-limiting protrusion F3 will finally lean against the narrow surface F2 of the channel F, the channel F still has enough ventilation space, thus the thermal management performance of the temperature control component 1 to the batteries 2 could be improved, and the service life of the batteries 2 could be greatly improved.

In some possible embodiments, for the first buffer plate 13 and the second buffer plate 14 which are adjacent in the up-down direction Z, the first buffer plate 13 is located below the second buffer plate 14; the wide surface F1 of the channel F is a surface of the first side plate 11 facing the second side plate 12, and the narrow surface F2 is a surface of the second side plate 12 facing the first side plate 11, that is, the position-limiting protrusion F3 within the channel F is disposed on the first side plate 11.

With reference to FIG. 27, FIG. 30 and FIG. 31, the first buffer plate 13 may have: a first end 131 connected with the first side plate 11; and a second end 132 connected with the second side plate 12. The second buffer plate 14 may have: a third end 141 connected with the first side plate 11; and a fourth end 142 connected with the second side plate 12. The wide surface F1 of the channel F is a portion of surface of the first side plate 11 between the first end 131 and the third end 141, and the narrow surface F2 is a portion of surface of the second side plate 12 between the second end 132 and the fourth end 142.

The first side plate 11 has a wall thickness of $c_1$ in the longitudinal direction Y, and a surface of the position-limiting protrusion F3 facing the narrow surface F2 has a size of b in the up-down direction Z, as shown in FIG. 30. During bending deformations of the first buffer plate 13 and the second buffer plate 14, since the position-limiting protrusion F3 will extrude a large surface of a corresponding battery 2 through the narrow surface F2 on the second side plate 12, in order to protect the battery 2 from a lithium precipitation phenomenon due to excessive extrusion pressure exerted by the position-limiting protrusion F3, $c_1<b$. In order to effectively reduce the extrusion pressure of the position-limiting protrusion F3 on the corresponding battery 2 so as to reduce a stress concentration of the position-limiting protrusion F3 on the large surface of the corresponding battery 2, in an implementation, $2.5c_1 \leq b \leq l$, where the narrow surface F2 has a size of l in the up-down direction Z, as shown in FIG. 30.

In other embodiments, for the first buffer plate 13 and the second buffer plate 14 which are adjacent in the up-down direction Z, the first buffer plate 13 is located above the second buffer plate 14; the wide surface F1 of the channel F is a surface of the second side plate 12 facing the first side plate 11, and the narrow surface F2 is a surface of the first side plate 11 facing the second side plate 12, that is, the position-limiting protrusion F3 within the channel F is disposed on the second side plate 12.

With reference to FIG. 27, FIG. 30 and FIG. 31, the first buffer plate 13 may have: a first end 131 connected with the first side plate 11; and a second end 132 connected with the second side plate 12. The second buffer plate 14 may have: a third end 141 connected with the first side plate 11; and a fourth end 142 connected with the second side plate 12. The wide surface F1 of the channel F is a portion of surface of the second side plate 12 between the second end 132 and the fourth end 142, and the narrow surface F2 is a portion of surface of the first side plate 11 between the first end 131 and the third end 141.

In the above embodiment, the second side plate 12 has a wall thickness of $c_2$ in the longitudinal direction Y, and a surface of the position-limiting protrusion F3 facing the narrow surface F2 has a size of b in the up-down direction Z, as shown in FIG. 30. During bending deformations of the first buffer plate 13 and the second buffer plate 14, since the position-limiting protrusion F3 will extrude a large surface of a corresponding battery 2 through the narrow surface F2 on the first side plate 11, in order to protect the battery 2 from a lithium precipitation phenomenon due to the excessive extrusion pressure exerted by the position-limiting protrusion F3, $c_2<b$. In order to effectively reduce the extrusion pressure of the position-limiting protrusion F3 on the corresponding battery 2 so as to reduce the stress concentration of the position-limiting protrusion F3 on the large surface of the corresponding battery 2, in an implementation, $2.5c_2 \leq b \leq l$, where the narrow surface F2 has a size of l in the up-down direction Z, as shown in FIG. 30.

With reference to FIG. 30, the temperature control component 1 has a thickness of H in the longitudinal direction Y, and the position-limiting protrusion F3 has a height of a in the longitudinal direction Y. During bending deformations of the first buffer plate 13 and the second buffer plate 14, since the height a of the position-limiting protrusion F3 determines the size of the ventilation space of the channel F subjected to deformation, in order to ensure the thermal management performance of the temperature control component 1 on the batteries 2, $1/5H \leq a < H$. In an implementation, $1/3H \leq a \leq 1/2H$.

With reference to FIG. 30 and FIG. 31, the position-limiting protrusion F3 may have: a main body part F31, extending from the wide surface F1 towards the narrow surface F2; and a protrusion part F32, disposed at an end of the main body part F31 close to the narrow surface F2 and protrudes from the main body part F31 in a circumferential direction (that is, the size of the protrusion part F32 in the circumferential direction is larger than the size of the main body part F31 in the circumferential direction), and at least part of the protrusion part F32 is situated within a projection area of the narrow surface F2 on the wide surface F1.

During bending deformations of the first buffer plate 13 and the second buffer plate 14, the protrusion part F32 of the position-limiting protrusion F3 will extrude a large surface of a corresponding battery 2 through the narrow surface F2. Because the size of the protrusion part F32 in the circumferential direction is larger than the size of the main body part F31 in the circumferential direction, the ventilation space of the channel F subjected to deformation would not be reduced as much as possible, and a contact area between the protrusion part F32 and the narrow surface F2 would also be guaranteed to reduce the extrusion pressure of the position-limiting protrusion F3 on the corresponding battery 2.

With reference to FIG. 1, FIG. 2, FIG. 9 and FIG. 24, the lower box 3 is used to support the multiple batteries 2. The multiple batteries 2 can be arranged in at least two rows of battery banks S in a lateral direction X, and the air duct component 4 is disposed between the two rows of battery banks S and fixed to the lower box 3. The temperature control component 1 has multiple channels F; an air duct is formed between the air duct component 4 and a corresponding battery bank S, and the air duct is in communication with multiple channels F of a corresponding temperature control component 1 and a fan 5. Specifically, with reference to FIG. 23, the air duct component 4 may include an air volume regulating plate 41, a first support plate 42, a second support plate 43, a mounting plate 44, and a sealing strip 45.

The air volume regulating plate 41 is disposed within the air duct; the first support plate 42 is spaced apart from the second support plate 43 in the longitudinal direction Y, and the first support plate 42 is close to the fan 5. The height of the air volume regulating plate 41 decreases sequentially in a direction from the first support plate 42 towards the second support plate 43, so that the air duct expands from a side close to the fan 5 to a side away from the fan 5 in the longitudinal direction Y.

The mounting plate 44 extends in the longitudinal direction Y and is connected with the first support plate 42 and the second support plate 43, and the air volume regulating plate 41 is fixedly mounted on the mounting plate 44. The sealing strip 45 is disposed on the first support plate 42, the second support plate 43 and the mounting plate 44. When the air duct component 4 is assembled with multiple batteries 2, the sealing strip 45 is adhered to a corresponding battery bank S for a sealing connection with the battery bank S.

During use of the battery pack, under the action of the fan 5, external air can enter the multiple channels F of the temperature control component 1 to achieve heat dissipation for the batteries 2. At the same time, based on the arrangement of the air volume regulating plate 41, the amount of external air entering different temperature control components 1 is different, thereby uniform heat dissipation for all the batteries 2 could be achieved.

With reference to FIG. 1, FIG. 2, FIG. 9 and FIG. 24, the end plate 8 is disposed at both ends of each battery bank S in the longitudinal direction Y. The cable tie 6 tightly bundles, in the circumferential direction, all the batteries 2 in a corresponding battery bank S, a corresponding temperature control component 1 and two corresponding end plates 8. The installation panel 9 is located on an outer side of a corresponding end plate 8 in the longitudinal direction Y; is fixedly connected with the lower box 3 and the corresponding end plate 8; and is fixedly installed with the fan 5.

Figure 2:
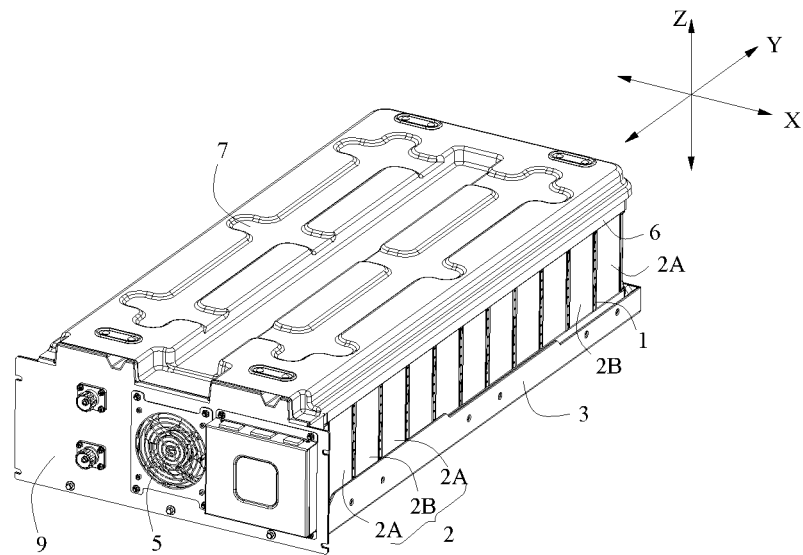
FIG. 2 is a perspective view of a battery pack in another embodiment of the present application.

With reference to FIG. 1 and FIG. 2, the harness isolation plate 10 is disposed above the multiple batteries 2 and fixed directly to the end plate 8, which could help to improve group efficiency and an integration degree of the battery pack. The upper box cover 7 is disposed above the harness isolation plate 10 and is fixedly connected with the harness isolation plate 10 through fasteners (such as rivets). Here, because the upper box cover 7 is provided with no buckle and other complex structures on its peripheral side, the upper box cover 7 can be directly processed with a plastic absorption process, thus processing costs could be reduced.

The invention claimed is:

1. A temperature control component, comprising:
    a first side plate;
    a second side plate, disposed opposite to the first side plate in a longitudinal direction, and connected with the first side plate to form a cavity together with the first side plate; and
    a first buffer plate, disposed between the second side plate and the first side plate and connected with the second side plate and the first side plate to divide the cavity into multiple channels, wherein at least part of the first buffer plate extends obliquely from the first side plate towards the second side plate;
    wherein the first side plate is provided with a first limit protrusion extending towards the second side plate in the longitudinal direction and located within a corresponding channel, and the first limit protrusion is situated within a projection area of the first buffer plate on the first side plate.

2. The temperature control component according to claim 1, wherein the first buffer plate is formed into a wave-shaped structure.

3. The temperature control component according to claim 1, wherein the first buffer plate is formed by extending, in entirety, obliquely from the first side plate towards the second side plate.

4. The temperature control component according to claim 1, wherein the first buffer plate is formed into a flat plate structure or an arc-shaped plate structure.

5. The temperature control component according to claim 1, wherein
    the first buffer plate is formed by extending, in entirety, obliquely upward from the first side plate towards the second side plate; and
    the temperature control component further comprises: a second buffer plate, disposed between the second side plate and the first side plate and connected with the second side plate and the first side plate, and the second buffer plate is formed by extending obliquely downward from the first side plate towards the second side plate.

6. The temperature control component according to claim 5, wherein
    the second buffer plate and the first buffer plate are formed into an arch-shaped structure; or
    the second buffer plate, the first buffer plate and a corresponding part of the first side plate are formed into a triangular structure; or
    the second buffer plate, the first buffer plate and a corresponding part of the second side plate are formed into a triangular structure.

7. The temperature control component according to claim 1, wherein
    the second side plate is provided with: a second limit protrusion extending towards the first side plate in the longitudinal direction and located within a corresponding channel, and the second limit protrusion is situated within a projection area of the first buffer plate on the second side plate.

8. The temperature control component according to claim 1, wherein
    the first buffer plate has a length of L, and the first buffer plate has a first end connected with the first side plate;
    the first limit protrusion is one in number, a distance between the first limit protrusion and the first end in an up-down direction is $a_1$, and $0<a_1 \leq L/2$; or
    the first limit protrusion is multiple in number, a distance between a first limit protrusion of the multiple first limit protrusions that is close to the first end and the first end in the up-down direction is $a_2$, and $0<a_2 \leq L/2$.

9. The temperature control component according to claim 5, wherein
    the second buffer plate divides the cavity into the multiple channels together with the first buffer plate;
    the first side plate is further provided with: a third limit protrusion extending towards the second side plate in the longitudinal direction, and the third limit protrusion is situated within a projection area of the second buffer plate on the first side plate; and
    the second side plate is provided with: a fourth limit protrusion extending towards the first side plate in the longitudinal direction, and the fourth limit protrusion is situated within a projection area of the second buffer plate on the second side plate.

10. The temperature control component according to claim 5, wherein the second buffer plate is spaced apart from the first buffer plate in an up-down direction.

11. The temperature control component according to claim 5, wherein the second buffer plate is directly connected with the first buffer plate.

12. The temperature control component according to claim 10, wherein the second buffer plate, the first buffer plate, the first side plate and the second side plate enclose a channel;

the channel has a wide face, a narrow face and a position-limiting protrusion; the narrow face is disposed opposite to the wide face in the longitudinal direction; the position-limiting protrusion protrudes from the wide face in the longitudinal direction and is spaced apart from the narrow face, and at least part of the position-limiting protrusion is situated within a projection area of the narrow face on the wide face.

13. The temperature control component according to claim 12, wherein the first buffer plate is located below the second buffer plate, and the wide surface of the channel is a surface of the first side plate facing the second side plate.

14. The temperature control component according to claim 12, wherein the first side plate has a wall thickness of $c_1$ in the longitudinal direction;

a surface of the position-limiting protrusion facing the narrow face has a size of b in the up-down direction, and $c_1<b$.

15. The temperature control component according to claim 14, wherein the narrow surface has a size of l in the up-down direction, and $2.5c_1 \leq b \leq l$.

16. The temperature control component according to claim 12, wherein the first buffer plate is located above the second buffer plate, and the wide surface of the channel is a surface of the second side plate facing the first side plate.

17. The temperature control component according to claim 12, wherein the position-limiting protrusion comprises: a main body part, extending from the wide face towards the narrow face; and a protrusion part, disposed at an end of the main body part close to the narrow face and protruding from the main body part in a circumferential direction;

at least part of the protrusion part is situated within a projection area of the narrow face on the wide face.

18. A battery pack, comprising multiple batteries and the temperature control component according to claim 1, wherein the multiple batteries comprise a first battery and a second battery, and the temperature control component is disposed between the first battery and the second battery.

19. The battery pack according to claim 18, wherein the multiple batteries are arranged in at least two rows of battery banks in a lateral direction, and the temperature control component is disposed between two adjacent batteries in each of the battery banks; and the battery pack further comprises: a lower box, supporting the at least two rows of battery banks; an air duct component, disposed between the two rows of battery banks and fixed to the lower box, and an air duct is formed between the air duct component and a corresponding battery bank, and the air duct is in communication with the multiple channels of a corresponding temperature control component; and a fan, in communication with the air duct.

20. The battery pack according to claim 19, wherein the air duct component comprises: an air volume regulating plate, disposed in the air duct and enabling the air duct to expand, in a longitudinal direction, from a side close to the fan to a side away from the fan.

* * * * *